(12) United States Patent
De Haas et al.

(10) Patent No.: US 11,639,563 B2
(45) Date of Patent: May 2, 2023

(54) WINDING AND TWISTING DEVICE OF A RING SPINNING OR RING TWISTING MACHINE AS WELL AS RING SPINNING AND RING TWISTING METHOD

(71) Applicant: SANKO TEKSTIL ISLETMELERI SAN.VE TIC.A.S. BASPINAR SUBESI, Gaziantep (TR)

(72) Inventors: Oliver De Haas, Dresden (DE); Lars Kühn, Dresden (DE)

(73) Assignee: SANKO TEKSTIL ISLETMELERI SAN.VE TIC.A.S. BASPINAR SUBESI, Gaziantep (TR)

( * ) Notice: Subject to any disclaimer, the term of this patent is extended or adjusted under 35 U.S.C. 154(b) by 0 days.

(21) Appl. No.: 16/983,818

(22) Filed: Aug. 3, 2020

(65) Prior Publication Data
US 2020/0362481 A1 Nov. 19, 2020

Related U.S. Application Data

(63) Continuation of application No. 16/093,546, filed as application No. PCT/EP2017/056642 on Mar. 21, 2017, now Pat. No. 10,767,285.

(30) Foreign Application Priority Data

Apr. 14, 2016 (EP) .................................... 16165311

(51) Int. Cl.
*D01H 7/52* (2006.01)
*F16C 32/04* (2006.01)

(52) U.S. Cl.
CPC ........... *D01H 7/52* (2013.01); *F16C 32/0438* (2013.01)

(58) Field of Classification Search
CPC .............. D01H 7/52; D01H 7/00; D01H 7/04; D01H 7/044; F16C 32/0438
See application file for complete search history.

(56) References Cited

U.S. PATENT DOCUMENTS

| 3,114,234 | A | | 12/1963 | Kobayashi |
| 3,785,140 | A | * | 1/1974 | Muller ..................... D01H 7/58 57/100 |

(Continued)

FOREIGN PATENT DOCUMENTS

| CH | 396 714 A | 12/1960 |
| CN | 105358748 A | 2/2016 |

(Continued)

OTHER PUBLICATIONS

International Search Report dated Sep. 13, 2017 for International Application No. PCT/EP2017/056642.

(Continued)

*Primary Examiner* — Ismael Izaguirre
(74) *Attorney, Agent, or Firm* — Crowell & Moring LLP

(57) ABSTRACT

The present invention provides a winding and twisting device of a ring spinning or ring twisting machine with at least one stator, which comprises at least one superconducting material and a stator cooling system, at least one rotor that creates a magnetic field, and a rotatable spindle, wherein the rotor and the stator are arranged co-axially to the spindle; and wherein the rotor and the stator are formed in a way that a ring-shaped air gap, which is arranged co-axially to the spindle and in which the thread to be wound up can circulate, is formed between the rotor and the stator. Furthermore, a ring spinning or ring twisting method, in which fiber material is twisted and subsequently wound up, is provided, in which such a winding and twisting device is used, wherein the rotor is held co-axially at a distance to the stator by a rotor holding device, wherein the temperature of the super- (Continued)

conducting material of the stator is reduced below the transition temperature of the superconducting material and wherein the rotor is released by the rotor holding device.

11 Claims, 3 Drawing Sheets

(56) References Cited

U.S. PATENT DOCUMENTS

| | | | |
|---|---|---|---|
| 3,851,448 A | | 12/1974 | Sano |
| 5,109,659 A | | 5/1992 | Tsuzuki |
| 5,220,232 A | | 6/1993 | Rigney, II |
| 5,631,617 A | | 5/1997 | Morishita |
| 5,719,455 A | * | 2/1998 | Higasa ................ F16C 32/0438 310/90.5 |
| 5,740,666 A | | 4/1998 | Yamaguchi |
| 2008/0170982 A1 | * | 7/2008 | Zhang ...................... D02G 3/44 423/447.3 |

FOREIGN PATENT DOCUMENTS

| | | |
|---|---|---|
| DE | 15 10 943 B1 | 4/1971 |
| FR | 1 399 710 A | 5/1965 |
| JP | H01 156524 A | 6/1989 |
| WO | WO 2012/100964 A2 | 8/2012 |

OTHER PUBLICATIONS

Indian Examination Report for IN Application No. 201817041807 dated Nov. 18, 2021 including translation (6 pages).

* cited by examiner

WINDING AND TWISTING DEVICE OF A RING SPINNING OR RING TWISTING MACHINE AS WELL AS RING SPINNING AND RING TWISTING METHOD

CROSS-REFERENCE TO RELATED APPLICATIONS

This application is a continuation of U.S. patent application Ser. No. 16/093,546, filed on Oct. 12, 2018, which claims the benefit under 35 U.S.C. § 371 of International Application No. PCT/EP2017/056642, filed Mar. 21, 2017, which claims the priority of European Patent Application No. 16165311.8, filed Apr. 14, 2016, all of which are incorporated by reference herein in their entirety.

FIELD OF THE INVENTION

The invention relates to a device for producing and winding-up of yarns in ring spinning and ring twisting machines, wherein the yarn is made rotate by a twisting element and wound up onto the bobbin due to an arising velocity difference to the spindle and bobbin.

STATE OF THE ART

Conventional ring spinning and ring twisting machines are equipped with a ring-rotor-system for twist insertion of the thread. As a consequence of the rotation of the spindle, the rotor into which the thread is hung and that is fastened flexibly on the ring is made rotate. The rotor, which can for example be formed as a simple wire loop, thereby has no intrinsic drive but is taken along by the spindle through the yarn that is hung into it. Through the high friction of the rotor on the ring, through the air resistance of the ring as well as the air resistance of the yarn balloon between the thread guiding loop and the rotor, the rotor is retained behind the speed of the spindle, which leads to the thread being wound up onto the bobbin.

During the movement of the rotor on the ring, friction occurs between the ring and the rotor due to the arising centrifugal force. As it is not possible to effectively dissipate the heat because of the low mass of the rotor, this results in a velocity limitation of the rotor. If the velocity of the rotor is increased further, the rotor will heat up as much as to glow through and to break. In addition, this leads to merging of thermoplastic fiber materials and to softening of honeydew-containing cotton materials.

The productivity limitation of the ring spinning method is mostly caused by the ring-rotor-system and depends on the ring, the rotor and the yarn. A productivity increase means a speed increase of the spindle that causes, however, a strongly increasing wear on the currently available rings and rotors when the limits are exceeded.

The limitation of the velocity of the rotor means that the delivery speed of the thread cannot be increased any further so that the existing ring-rotor-system limits the capacity of ring spinning and ring twisting machines.

From the WO 2012/100964 of the applicant, a winding and twisting device of a ring spinning or ring twisting machine is known, in which the friction between the ring and the rotor is eliminated by magnetic levitation, which extends the lifespan significantly and reduces the impacting forces. A ring-shaped stator with a superconducting material and a stator cooling device is arranged co-axially to the bobbin in the same way as a ring-shaped rotor, which can be rotated in relation to the stator and creates a magnetic field, with a loop-shaped yarn guiding element. When the superconducting material of the stator cools down below the transition temperature, the magnetic flux of the rotor that has entered the stator is frozen so that an autostable, passive support of the rotor, which has initially been supported mechanically, can be achieved by means of magnetic levitation. Due to the contactless support of the rotating rotor, the ring of the traditional ring-rotor-system may be omitted as a significant component that limits productivity due to its creation of friction heat. Instead, the entire rotor with the yarn-guiding element is now made rotate fast, wherein the rotation is essentially friction-free—with the exception of a weak magnetic friction—and therefore allows for significantly higher spindle speeds.

The rotor formed as a magnet ring, however, has a considerable dead weight that also has to be accelerated during start-up of the spindle. In addition, the free-floating magnet ring cannot be installed in a housing so that the magnet ring, which rotates at high speeds of approx. 20,000 to 30,000 rotations per minute, causes a safety risk for an operator of the installation. Eventually, the yarn guiding element installed on the magnet ring constitutes an imbalance that becomes the more problematic the more the speed of the spindle is increased.

The present invention is consequently based on the purpose of creating a device for twisting fiber material and winding-up the arising yarn or twist in ring spinning and ring twisting machines, which enables a fast start-up and shutdown of the machine at a high capacity and which in addition improves the safety of the operating staff. In very general terms, the invention is based on the purpose of further increasing the productivity of ring spinning and ring twisting machines.

DESCRIPTION OF THE INVENTION

The problems mentioned above are solved by a winding and twisting device for ring spinning and ring twisting machines with the features of the independent claim 1 and a method with the features of the independent claim 14. Advantageous variants and further developments are described in the dependent patent claims.

According to the invention, the winding and twisting device of a ring spinning or ring twisting machine comprises at least one stator, which comprises at least one superconducting material and a stator cooling system, at least one rotor that generates a magnetic field, and a rotatable spindle, wherein the rotor and the stator are arranged co-axially to the spindle and wherein the rotor and the stator are formed in a way that a ring-shaped air gap, which is arranged co-axially to the spindle and in which the thread to be wound up can circulate, is formed between the rotor and the stator.

The formed air gap is formed in a ring-shaped way, wherein its position and extension during operation of the installation are formed in a way that the thread to be wound up is wound up onto the rotating bobbin on the lower end of the yarn balloon through the air gap. For example, the air gap can have a width of 2 to 3 mm. Through the rotation of the spindle and the sleeve put onto said spindle with the bobbin, the thread is taken along in circulation in the known way. As, due to the air friction of the yarn balloon, the circulation of the thread occurs more slowly than the fast rotation of the spindle, the thread is twisted and spun while being wound up.

The rotor and/or stator can in particular have at least one ring-shaped yarn guiding element that is arranged co-axially to the spindle, wherein the yarn guiding element of the rotor and/or the yarn guiding element of the stator are arranged in a way as to delimit the air gap. Hence, the yarn guiding elements form ring-shaped delimitation elements, wherein the circulating thread slides on the surface of one or both delimitation elements. The friction that arises in this process is extremely low so that very high speeds of the spindle can be achieved. Together with the air friction, the friction with the yarn guiding element determines the relative velocity between the circulating thread and the spindle rotation. Consequently, the surface texture of the ring-shaped yarn guiding element determines the spinning quality using the friction.

In contrast to the state of the art, the yarn guiding elements do not form a loop or a similar device that circulates with the thread, but only delimitation elements that are arranged co-axially to the spindle axis and that define the expansion of the air gap. As a result, it is no longer required for the rotor to rotate with the thread around the spindle axis, albeit this rotation is not necessarily excluded according to the present further development. Due to the magnetic levitation of the rotor described below, a guiding of the thread without moving mechanical parts is possible as the floating rotor can be positioned in a contactless way. Although the rotor, as described further below, can be positioned in particular in a torque-proof way so that no rotation of the rotor takes place anymore, this term shall be used here and in the following as a synonym for the general term of an element that creates a magnetic field and that is arranged co-axially to the spindle axis. The concept of the rotor therefore relates more to the contactless support than to the function as a rotating element. In the general further development, it can in addition be tolerated that the rotor will be gradually made rotate due to the friction of the thread that is sliding on it during the operation of the installation. But unlike in previous situations, the installation can be started significantly faster as the thread can be made rotate practically instantly due to the low friction with the yarn guiding element of the rotor.

The yarn guiding elements are formed in a way as to facilitate a guiding of the thread to be wound up that is horizontal, i.e. oriented in the circulation direction, and optionally a guiding of the thread that is vertical, i.e. oriented along the spindle axis. This takes place for example due to the yarn guiding elements forming deflecting elements for the thread through their arrangement on the rotor and/or stator. To avoid tearing of the thread during operation, the yarn guiding elements can be formed with an appropriately smooth surface and in particular with a rounded shape. In the spinning process, the thread slides in the circulation direction on the smooth surface of the yarn guiding element(s) that prevent(s) the thread from being entangled in the rotor and/or stator that is in particular not formed rotation-symmetrically. The yarn guiding elements are therefore used to keep the thread away from potential surface irregularities and edges of the winding and twisting device.

In addition, the rotor and the stator can each have multiple ring-shaped yarn guiding elements as long as the air gap is delimited by at least one yarn guiding element of the rotor and/or at least one yarn guiding element of the stator. As the rotor and the stator with the exception of the yarn guiding elements do not necessarily have to be formed in a ring-shaped way, their co-axial arrangement essentially relates to the mentioned yarn guiding elements. In addition, the subsections mentioned below can in particular be arranged along the circumference of a co-axial circle around the spindle axis.

As described in greater detail below, the rotor can comprise at least subsections with a permanent-magnetic material that generate a magnetic field. This means that the rotor is magnetized at least in sections or that it has permanent magnets. Other subsections of stator and rotor can also be made of other, also non-magnetic materials. This is in particular true for the yarn guiding elements. To facilitate the levitation of the rotor, in particular materials that reduce the weight of the rotor can be used.

To enable the formation of a superconducting state in the area of the stator, the stator has to allow the magnetic flux of the rotor to enter said stator, and there has to be a cooling device for cooling the stator. This stator cooling device for creating low temperatures, which are required for the formation of the superconducting state of the superconducting material, is formed in a way that it can reduce the temperature in the superconducting areas of the stator until it falls below the transition temperature of the used superconducting material. In a variant of the invention, the cooling device can be formed as a bath cryostat, which can be filled with liquid nitrogen if high-temperature superconductors with transition temperatures above 77K are used, wherein also other cryostats such as vaporization cryostats, in which cooling takes place by means of cold gas, or refrigerator cryostats, for which no cryoliquid is necessary, are used in other variants. Through different combinations of multiple cooling devices, which differ in taking advantage of different physical effects for the generation of cold, said cryostats can also be interconnected redundantly in order to increase the reliability of the system. In this context, the superconducting materials can be surrounded and/or coated by an appropriate thermal insulation to minimize cooling losses, which can be formed as part of the stator cooling device.

As on one hand the installation of loops or similar devices as yarn guiding elements on the rotor is no longer required for the winding and twisting device according to the invention and as on the other hand no rotation of the rotor is required any longer either, an essentially imbalance-free rotor can be formed that can consequently be positioned more easily in an inherently stable way.

In particular, the rotor and the stator can be formed and arranged in a way that the rotor can be positioned in a contactless way due to magnetic levitation during the operation. This shall be understood as the support of the rotor being free-floating and hence contactless after cooling down of the superconducting areas of the stator. By maintaining an optimal distance of the delimitation areas, which are located opposite to one another, from the rotor and the stator and through the pinning of the flux tubes of the inhomogeneous magnetic field of the rotor permeating the stator through reduction of the temperature of the superconducting material below its transition temperature, an inherently stable, passive support of the rotor is possible both without as well as with rotation of the rotor. Therefore, complex control and/or sensor units for active bearing control of the rotor can be omitted. The absence of wear is ensured through the optimal distance, which results in a high reliability and robustness. Thanks to the contactless support of the rotor and the omission of the ring of the traditional ring-rotor-system as a substantially productivity-limiting (due to its creation of friction heat) component, the rotation velocities of the thread and the spindle can be increased significantly, which, in turn, leads to a drastic productivity increase in connection with a possible increase of the diameter of the bobbin.

The arising inherently stable, passive support of the rotor comes from the equilibrium of the restoring forces caused by changes of the position and orientation and the pinning forces of the flux tubes to the superconducting material of the stator.

The rotor and/or the stator can be formed in a way that the rotor is pinned to the stator with regard to a rotation around the spindle axis through the created magnetic field. This can be achieved by the magnetic field of the rotor not being rotationally symmetric around the spindle axis. Further, superconducting areas of the stator can alternate with normally conducting or insulating areas in the circumferential direction and/or the superconducting areas can have defects. The superconducting areas quantize the magnetic field in form of flux tubes that can be attached to the defects. Due to the resulting gradient of the magnetic flux, a holding force arises. Then, a rotation of the rotor will only be possible against this holding force that is not overcome through the low friction of the circulating thread on the surface of the yarn guiding elements. Hence, the rotor is not only free-floating but also positioned in a torque-proof way so that no additional masses have to be accelerated during the start of the installation.

In particular, the rotor can have one or multiple subsections with a permanent-magnetic material that create a magnetic field. Even with a single subsection that creates a magnetic field, a stable support of the rotor is possible. In two or multiple subsections with a permanent-magnetic material, the created magnetic field attains a multipolar character that facilitates the torque-proof support. The subsections can for example be designed in form of bar or cylinder magnets that are arranged at regular intervals on the ring-shaped yarn guiding element. In this context, the polar pitch can preferably be chosen in a way as to be larger than the air gap in order to guarantee effective entry of the magnetic field into the superconducting areas of the stator. In between, non-magnetic segments can be arranged that can be formed in a particularly light way in order to facilitate levitation. Likewise, the intermediate segments can be omitted completely in order to further reduce the weight of the rotor. In the simplest case, the rotor can be a guiding ring for the thread on which two or more bar or cylinder magnets are installed.

Furthermore, the stator can have two or multiple superconducting subsections that are spaced in relation to one another in the circumferential direction of the spindle. Hence, the superconducting part does in particular not have to extend over the whole circumference so that the stator cooling system can be significantly more compact and energy-saving. The superconducting subsections can have a type II superconductor as a superconducting material. In one embodiment, these can be ceramic high-temperature superconductors from the group of the rare earth barium-copper oxides (SE) BaCuO, for example yttrium-barium-copper oxides (YBaCuO) or from the group of the bismuth-strontium-calcium-copper oxides (BiStCaCuO). Also variants of the invention that have a superconducting material, which has an even higher transition temperature than the groups already mentioned, in the subsections of the stator are possible. Therefore, the performance parameters of the cooling device can be reduced, which leads to an increased energy efficiency of the described winding and twisting device. In this context, the superconducting subsections are always surrounded by a thermal insulation that is used to minimize cooling losses.

Segments of normally conductive and/or insulating materials can be arranged between the superconducting subsections. To save material, however, these intermediate segments can also be omitted completely. In this case, the stator only consists of the ring-shaped yarn guiding element(s) and two or multiple superconducting subsections that are arranged on these yarn guiding elements. In particular, the superconducting subsections can be arranged in regular intervals in the periphery, i.e. along a circle around the spindle axis, of the spindle. This allows for a particularly stable installation of the rotor.

For each superconducting subsection of the stator, the rotor can have an appropriately arranged subsection with a permanent-magnetic material. Therefore, respectively one superconducting subsection of the stator and a subsection of the rotor are located opposite to one another, which can ensure a particularly effective pinning of the magnetic flux lines. Ideally, the respective subsections can have equal or comparable extensions in the circumferential direction. In particular, the rotor and the stator can have exactly three subsections. The resulting three-point-fixation allows for a particularly stable contactless support of the rotor during the entire spinning process.

According to a further development, the rotor and the stator can be arranged in a co-planar way with the stator enclosing the rotor and the thread being guided through the air gap from above. The terms "above" and "below" shall be understood here and in the following with regard to a ring spinning or ring twisting machine that stands on a mounting surface. The fiber material and/or the thread is usually led from above to the bobbin that is wound up on the sleeve, in the process of which a so-called yarn balloon is formed due to the fast rotation of the thread. In the co-planar arrangement, the rotor is located within the stator in a radial direction wherein in particular, the ring-shaped yarn guiding element of the rotor is located within the ring-shaped yarn guiding element of the stator. Viewed from inside in an outward direction, the arrangement can then look in particular as follows:

a) segments of the rotor with permanent-magnetic material,
b) ring-shaped yarn guiding element of the rotor that encloses the segments,
c) air gap,
d) ring-shaped yarn guiding element of the stator that is located opposite to the yarn guiding element of the rotor and that encloses the latter, and
e) superconducting segments of the stator.

Such an arrangement is particularly compact and enables an efficient cooling of the superconducting areas. The thread can be guided in a particularly simple way from above through the air gap between the ring-shaped yarn guiding elements and be wound up onto the bobbin below the rotor. In this process, the thread will generally slide on the surface of the yarn guiding ring of the rotor so that said surface can advantageously be formed in a smooth way. In addition, the cross-section of the yarn guiding ring can be designed in a way, for example by means of roundings, that tearing of the thread on the lower edge of the ring can be prevented.

According to an alternative further development, the rotor and the stator can be arranged in parallel at an axial distance to one another with the thread being guided from outside through the air gap. The terms "inside" and "outside" shall be seen in this context in relation to the spindle axis. The rotor can be arranged in a way as to be located above or below the stator as far as the axial distance from the stator and the rotor is small enough as to enable the magnetic field of the rotor to enter the superconducting area of the stator. Due to the axial distance between the rotor and the stator, an air gap will be formed in addition through which the thread is guided from the outside. In this process, the yarn guiding elements of the rotor and the stator are located opposite to one another at least partially in the vertical direction, i.e. along the spindle axis. As in the previous further development, the yarn guiding elements can also in this case be formed with rounded edge profiles in order to avoid tearing of the thread. In another further development of this type, two stators can be arranged in a way that their delimitation areas located axially opposite to one another are respectively located opposite to an axial delimitation area of the rotor. Therefore, two ring-shaped air gaps are formed, wherein the thread can be guided either through one or the other air gap. The described further developments of the yarn guiding elements shall be applied accordingly in this case.

According to a further development, at least the part of the surface of the yarn guiding element of the rotor and/or stator that comes in contact with the thread can be coated. In particular, the whole yarn guiding element of the rotor and/or the stator can be coated. In this context, the coating can be chosen in a way as to ensure a desired friction with the circulating thread for the envisaged circulation velocity, in the process of which the thread is spun in the desired spinning quality. For example, the coating can have an average roughness value Ra (µm) in the range from Ra=0.025 (lapping) to Ra=0.5 (pre-grinding) according to DIN EN ISO 4287:2010-07.

Furthermore, the yarn guiding elements can be made of a plastic material or a light metal or comprise a plastic material and/or light metal. Yarn guiding elements of this type can be formed with a low weight and at the same time with sufficient stability and thermal resistance so that the levitation of the rotor can be guaranteed while ensuring a low level of wear.

According to a further development, the stator can be held by a holding device of the winding and twisting device, with said holding device being formed with a fixed position and with the spindle with the bobbin being able to move axially in relation to the fixed stator, i.e. along the spindle axis in order to wind up the yarn evenly onto the bobbin. In another embodiment of the invention, however, the spindle with the bobbin is fixed and the stator holding device is connected to a stator displacing device so that the winding and twisting device for ring spinning and ring twisting machines can move axially in relation to the spindle and the bobbin, i.e. along the spindle axis.

For the formation of the stator holding device, a radial distance between the bobbin and the inner radial delimitation area of the stator or rotor, depending on which one has the smaller radius, shall be maintained. To maintain the air resistance created by the yarn balloon equal during the period of winding the yarn or twist onto the bobbin, it is possible for the embodiment with a moving winding and twisting device to form the thread guider on the upper end of the yarn balloon in a way that it is also held by the stator holding device or that it is fastened directly on the stator so that the thread guider can be displaced in the axial direction together with the winding and twisting device. Therefore, the distance of the thread guider from the rotor, and consequently the expansion of the thread balloon, remains constant during the winding process.

The problems mentioned above are also solved by a ring spinning or ring twisting method in which the fiber material is twisted and subsequently wound up, wherein a winding and twisting device as described above is provided, wherein the rotor is held co-axially by a rotor holding device at a distance to the stator, wherein the temperature of the superconducting material of the stator is reduced below the transition temperature of the superconducting material and wherein the rotor is subsequently released by the rotor holding device before the actual spinning or twisting process starts as soon as the superconducting state of the stator is reached.

Through initial holding of the rotor at a distance to the stator, which is structurally predetermined or selectable, start-up of the machine is substantially facilitated in the proposed solution.

In the mentioned ring spinning or ring twisting method, the spindle can be driven with a speed around the spindle axis, for which the friction of the circulating thread with the yarn guiding element is not sufficient for overcoming the torque-proof magnetic support. In other words, the restoring force, which is caused by the pinning of the magnetic flux lines, with regard to a rotation of the rotor is higher than the friction forces of the circulating thread onto the yarn guiding element of the rotor that arise during operation.

The described winding and twisting devices as well as ring spinning and ring twisting methods allow for a significant increase of the speed of the spindle at a constant quality of the spun yarn. In addition, the ring spinning or ring twisting machine can be started without any time lag so that there will be now rejects of low-quality yarn.

Further features and exemplary embodiments as well as advantages of the present invention will be explained in greater detail by means of the drawings in the following. It is clear that the embodiments do not exhaust the field of the present invention. It is further clear that some or all of the features described in the following can also be combined with one another in a different way.

In the Figures described in the following, identical reference signs denominate the same elements. For the sake of better clarity, identical elements will only be described when they appear for the first time. However, it is clear that the variants and embodiments of an element described with reference to one of the Figures can also be applied to the respective elements in the remaining Figures.

Figure 1:
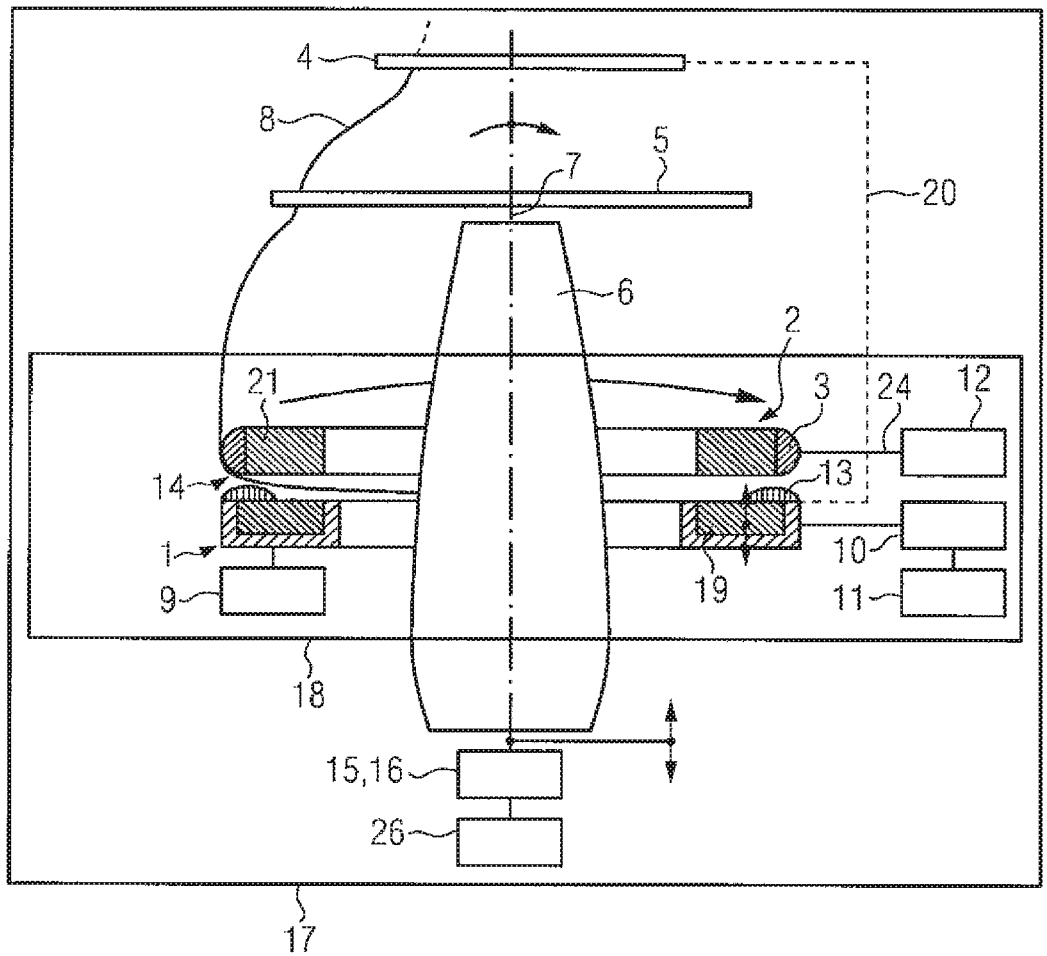
FIG. 1 shows a schematic representation of a winding and twisting device for ring spinning machines according to a first embodiment of the invention, in which the stator and the rotor are arranged in parallel and at an axial distance to one another.

The embodiment that is displayed schematically in the side view in FIG. 1 is the section of a ring spinning machine 17 that comprises a winding and twisting device 18 according to the present invention. The stator 1, which has at least one superconducting material 19, is arranged co-axially to the spindle and/or spindle axis 7 and is cooled down below the transition temperature of the superconducting material 19 by the stator cooling device 9. The stator 1, which is disposed below the rotor 2 in this exemplary further development, is held by a stator holding device 10 that is only indicated schematically. However, as magnetic levitation is also possible in a suspended position, also embodiments in which the stator is disposed above the rotor as well as embodiments in which a stator is disposed below the rotor and a further stator is disposed above the rotor are comprised.

The rotor 2 and the stator 1 are arranged in parallel and at an axial distance to one another so that they are not in contact with each other and that the magnetic field created by a permanent-magnetic material 21 of the rotor can enter the superconducting material 19 of the stator 1. In particular, the rotor 2 and the stator 1 are formed in a way that a ring-shaped air channel 14, which is disposed co-axially to the spindle 7 and in which the thread 8 to be wound up can circulate, can be formed between the rotor 2 and the stator 1. As shown in FIG. 1, the thread 8 is guided for this purpose from outside around the rotor 2 and through the air gap 14 to the bobbin 6. The stator 1 and the rotor 2 thereby comprise in particular no elements that could hamper the circulation of the thread 8 in the air gap.

Rather, the rotor 2 in the exemplary embodiment shown here has a ring-shaped yarn guiding element 3 that is disposed co-axially to the spindle 7 and on whose surface the thread 8 slides and/or rolls off during its circulation around the spindle axis. For this purpose, the yarn guiding element 3 is disposed on the outside of the rotor 2 in a radial direction and equipped with a smooth, rounded surface in such a way that the thread 8 will not tear during guiding over the surface. In the exemplary further development shown in FIG. 1, also the stator 1 has a yarn guiding element 13, which is also formed in a ring-shaped way and which is disposed co-axially to the spindle 7. The thread 8 is thereby guided in the air gap 14 formed between the yarn guiding elements 3 and 13. It is clear that, depending on arrangement and formation, both the rotor 2 as well as the stator 1 can comprise other or differently formed yarn guiding elements as long as said elements are formed in a ring-shaped way and co-axially around the spindle axis and guarantee reliable guiding of the thread from outside through the air gap 14 to the bobbin 6. In addition, the arrangement of the yarn guiding elements has to be adapted to the relative arrangement of the rotor 2 and the stator 1. Most importantly, the yarn guiding elements have to enable the free circulation of the thread 8 and hence are not formed as a closed rotor that has to circulate around the spindle axis with the thread. It is therefore possible to anchor the free-floating rotor 2 magnetically into the stator 1 so that it is positioned in a fixed and contactless way during operation of the installation. As no masses have to be accelerated anymore from now on, the installation can be started without delay.

For start-up and shut-down of the winding and twisting device 18, the rotor 2 is held coaxially at a distance to the stator 1 by a rotor holding device 12, the temperature of the stator 1 is reduced below the transition temperature of the superconducting material 19 and the rotor 2 is subsequently released by the rotor holding device 12. For this purpose, the schematically displayed mechanical connection 24 can be retracted during operation.

The yarn 8 runs through the yarn guider 4, continues through the balloon narrowing ring 5 as well as from the outside over the yarn guiding element 3 of the rotor 2 in order to be wound up onto the bobbin 6 as, due to the friction of the circulating yarn 8 on the surface of the yarn guiding element 3 and through the air friction of the yarn balloon that is being formed, a relative velocity between the spindle 7 that is held by the spindle holding device 15 and that is made rotate by the spindle rotating device 16 emerges in relation to the circulation velocity of the thread 8. The relative velocity can be influenced by the surface texture of the, in particular coated, yarn guiding element 3, by means of which the spinning quality of the created yarn can be adjusted accordingly.

For winding up the yarn 8 onto the bobbin 6, the stator holding device 10 is displaced in a variant of the invention by means of the stator displacing device 11 along the spindle axis, in the process of which the yarn guiding 4 and optionally the balloon narrowing ring 5 can be moved along through an optional rigid connection 20 (indicated schematically) while, however, the spindle 7 does not change its position in relation to the ring spinning machine 17. In another variant of the invention, the position of the winding and twisting device 18 in relation to the ring spinning machine 17 remains fixed while the spindle 7 with the bobbin 6 is displaced along the spindle axis by means of the spindle displacement device 26.

Figure 2:
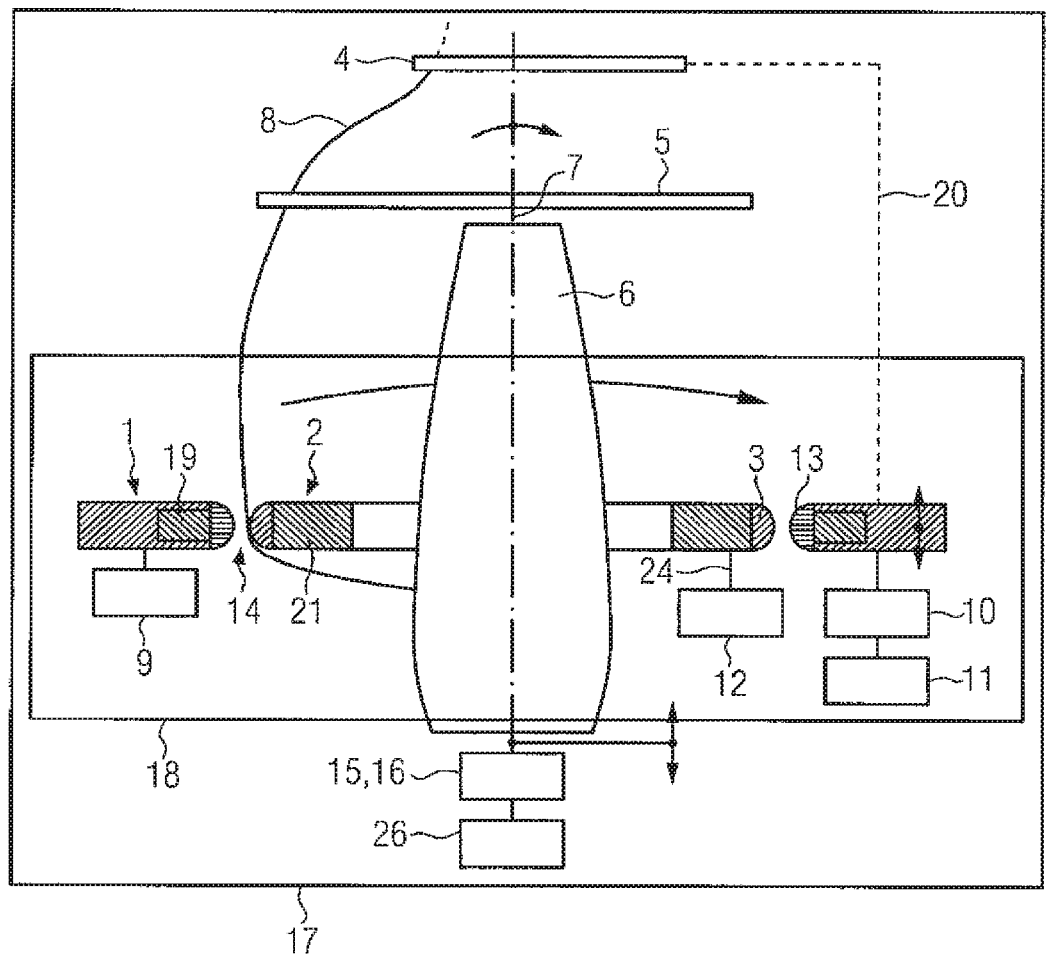
FIG. 2 shows a schematic representation of a winding and twisting device for ring spinning machines according to a second embodiment of the invention, in which the stator and the rotor are arranged in a co-planar way and in which the stator encloses the rotor.

FIG. 2 shows an alternative further development of the winding and twisting device 18 of a ring spinning machine 17 in a schematic side view. As already in the previous embodiment, the stator 1, which has at least one superconducting material 19, is arranged co-axially to the spindle and/or spindle axis 7 and is cooled down below the transition temperature of the superconducting material 19 by the stator cooling device 9. As shown in greater detail in FIG. 3, the co-axial arrangement of the stator 1 and/or of the rotor 2 does, however, not imply that the stator 1 and/or rotor 2 have to be formed in a ring-shaped way. Only the radial distance of the segments of the stator 1 and/or rotor 2 described further below from the spindle axis has to be equal. In the further development shown in FIG. 2, the rotor 2 and the stator 1 are arranged co-axially with the stator enclosing the rotor so that they are not in contact and that the magnetic field created by the permanent-magnetic material 21 of the rotor 2 can enter the superconducting material 19 of the stator 1. As the stator 1 is held by the stator holding device 10 and as the thread circulates through the ring-shaped air gap 14, the rotor 2 has to be disposed within the stator 1.

In the shown embodiment, the rotor 2 has a ring-shaped yarn guiding element 3 that is arranged co-axially to the spindle 7 and through which the thread 8 is led from above through the air gap 14 to the bobbin 6. Also in this case, the yarn guiding element 3 is disposed radially on the outer circumference of the rotor 2 and formed with a smooth, rounded surface so that the thread 8 can be guided with a high velocity over the surface of the yarn guiding element 3 without tearing. In addition, the stator 1 has a ring-shaped yarn guiding element 13 that is disposed radially on its inner circumference and that delimits the formed ring-shaped air gap 14 together with the yarn guiding element 3.

For start-up and shut-down of the winding and twisting device 18, the rotor 2 is held by a rotor holding device 12 co-axially and with a distance to the stator 1, the temperature of the stator 1 is reduced below the transition temperature of the superconducting material 19 and the rotor 2 is subsequently released through retraction of the mechanical connection 24 of the rotor holding device 12.

The yarn 8 runs through the yarn guider 4, continues through the balloon narrowing ring 5 as well as from above through the ring-shaped air gap 14 formed between the stator 1 and the rotor 2 in order to be wound up onto the bobbin 6, wherein, due to the friction of the thread 8 that circulates on the surface of the yarn guiding element 8 and due to the air friction of the yarn balloon, a relative velocity arises between the spindle 7, which is held by the spindle holding device 15 and made rotate by the spindle rotation device 16, with regard to the circulation velocity of the thread 8 that determines the spinning quality. Again, a desired spinning quality can be set through an appropriate choice of the surface texture of the yarn guiding element 3.

For winding up the yarn 8 onto the bobbin 6, the stator holding device 10 is displaced in one embodiment of the invention by means of the stator displacing device 11 along the spindle axis, wherein the thread guiding 4 and optionally the balloon narrowing ring 5 can be moved along via an optional rigid connection 20 while the spindle 7 does not change its position in relation to the ring spinning machine 17. In another embodiment of the invention, the position of the winding and twisting device 18 remains unchanged in relation to the ring spinning machine 17 while the spindle 7 with the bobbin 6 is displaced along the spindle axis by means of the spindle displacing device 26.

Figure 3:
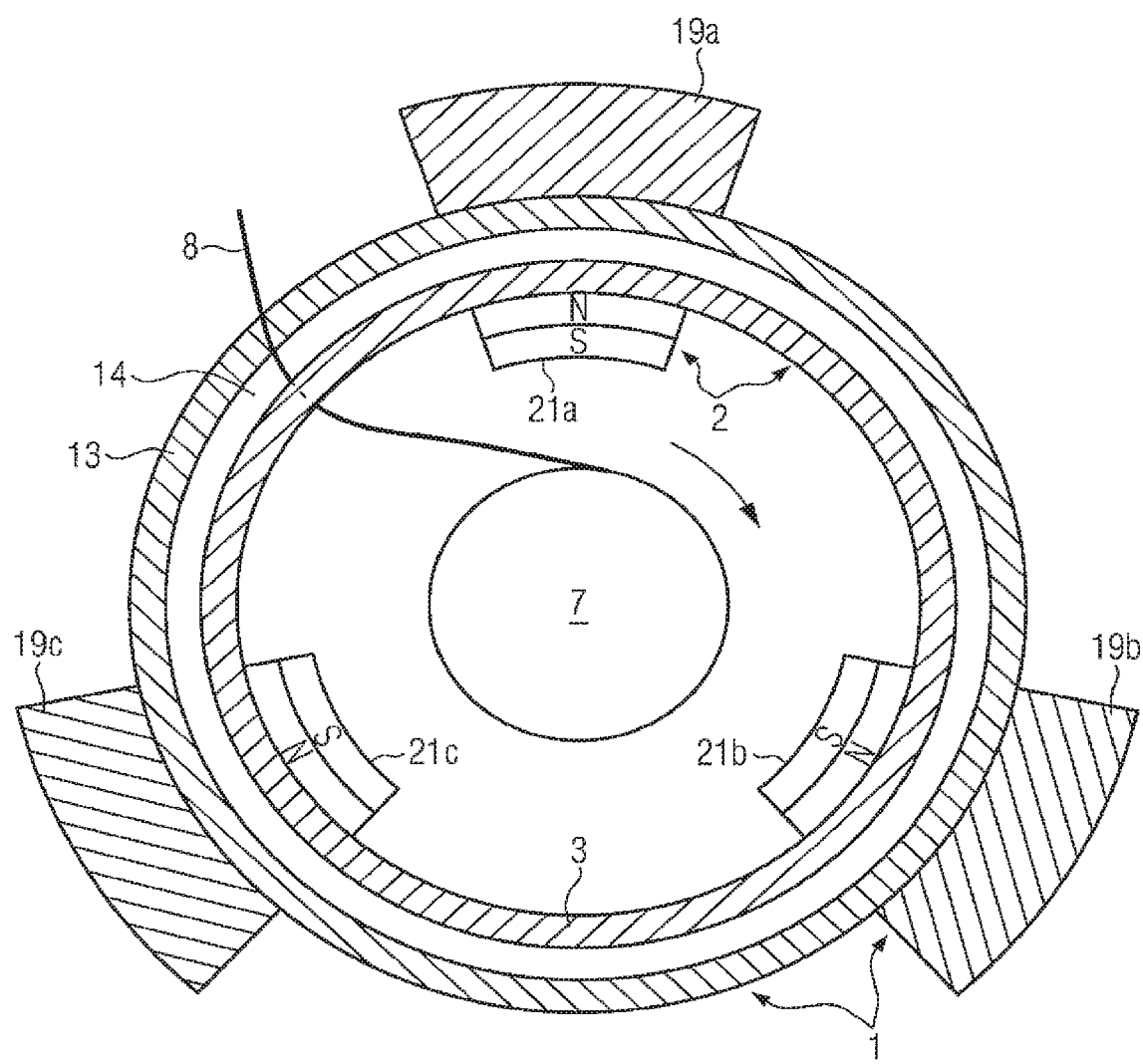
FIG. 3 shows a top view of an exemplary further development of the stator and the rotor for torque-proof, contactless support of the rotor.

A special further development of the stator and the rotor for torque-proof, contactless support of the rotor is shown exemplarily in FIG. 3. While the yarn guiding elements 3 and 13 are formed in a ring-shaped way, both the permanent-magnetic areas 21 of the rotor 2 as well as the superconducting areas 19 of the stator 1 are only formed in segments. In the displayed, nonlimiting further development, the rotor 2 comprises three subsections 21a-c with a permanent magnetic material, which are arranged at regular intervals along the inner circumference of the yarn guiding element 3 and which can be formed for example as shown as bar or cylinder magnets. In this context, the magnets are fastened on the yarn guiding element 3 and carry said element during operation. Alternatively, the yarn guiding element 3 can itself comprise the permanent-magnetic subsections, for example as magnetized segments of a metal ring. In the embodiment mentioned first, the rotor 2 can be formed with a particularly light weight by forming the yarn guiding element 3 for example of a plastic material or a light metal and with a low thickness. Therefore, the magnetic levitation can already be reached with a low field strength.

In correspondence to the rotor 2, the stator 1 has three superconducting subsections 19a-c, which are arranged at equal intervals along the outer circumference of the yarn guiding element 13 and which can be formed with regard to their expansion and their arrangement in a way that they are exactly opposite to the permanent-magnetic subsections 21a-c of the rotor 2. The superconducting subsections 19a-c can therein be held by the stator holding device or the stator cooling device while they hold the yarn guiding element 13 for their part. The latter can potentially also be omitted. The illustrated arrangement with respectively three subsections allows for a stable, contactless support of the rotor, which is in addition torque-proof due to the pinning of the magnetic flux lines to the superconducting subsections 19a-c. As shown in FIG. 3, the thread 8 can be guided from above through the air gap 14 between the two yarn guiding elements 3 and 13 and circulate around said air gap. There is consequently no longer a requirement to accelerate the rotor 2 during start-up of the ring spinning machine and to slow down said rotor during shutdown. Due to the low friction of the circulating thread 8, very high speeds of the spindle 7 can be achieved in addition, which can increase the productivity of the ring spinning machine. As the rotor 2—in spite of the name—does no longer rotate, there is in addition no more risk of injury for the operating staff.

The invention claimed is:

1. A winding and twisting device of a ring spinning or ring twisting machine, the winding and twisting device comprising:
    at least one stator that comprises at least one superconducting material and a stator cooling device,
    at least one rotor that generates a magnetic field, and
    a rotatable spindle,
    wherein the rotor and the stator are arranged co-axially to the spindle; and
    wherein the stator has a plurality of superconducting subsections that are spaced from one another in a circumferential direction of the spindle.

2. The winding and twisting device according to claim 1, wherein the plurality of superconducting subsections is arranged in regular intervals in a periphery of the spindle.

3. The winding and twisting device according to claim 1, wherein a normally conductive material is arranged between the plurality of superconducting subsections.

4. The winding and twisting device according to claim 1, wherein an insulating material is arranged between the plurality of superconducting subsections.

5. The winding and twisting device according to claim 1, wherein the stator has exactly three superconducting subsections.

6. The winding and twisting device according to claim 1, wherein the rotor and the stator are arranged in a co-planar way so that the stator encloses the rotor.

7. The winding and twisting device according to claim 1, wherein the rotor and the stator are arranged in parallel and at an axial distance to one another.

8. The winding and twisting device according to claim 1, wherein the rotor and the stator are formed in a way that the rotor can be supported in a contactless way due to magnetic levitation during operation of the winding and twisting device.

9. The winding and twisting device according to claim 1, wherein at least one of the rotor and the stator has at least one yarn guiding element that is arranged co-axially to the spindle.

10. The winding and twisting device according to claim 9, wherein at least a part of a surface of the at least one yarn guiding element of the at least one of the rotor and the stator is coated.

11. The winding and twisting device according to claim 9, wherein the at least one yarn guiding element of the at least one of the rotor and the stator is made of plastic or light metal or comprises plastic or light metal.

* * * * *